March 5, 1963 H. L. CAMPBELL 3,080,241
OUTSIDE PIPE-CUTTING TOOL
Filed Nov. 16, 1959 2 Sheets-Sheet 1
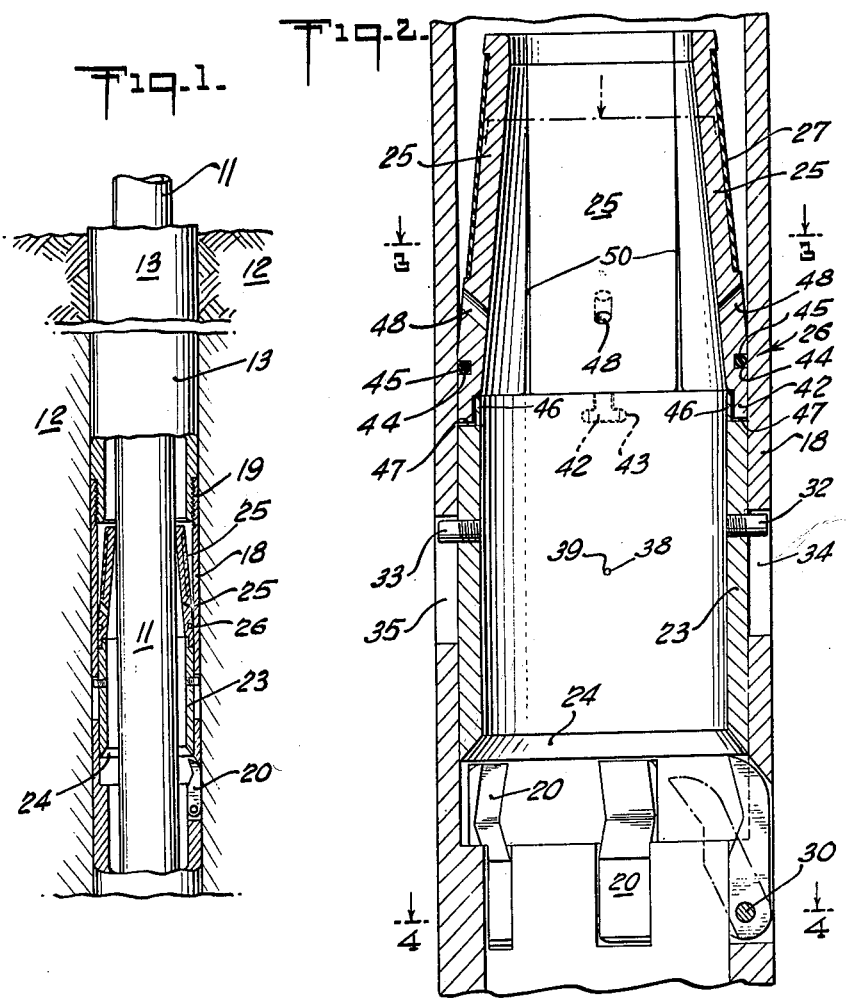
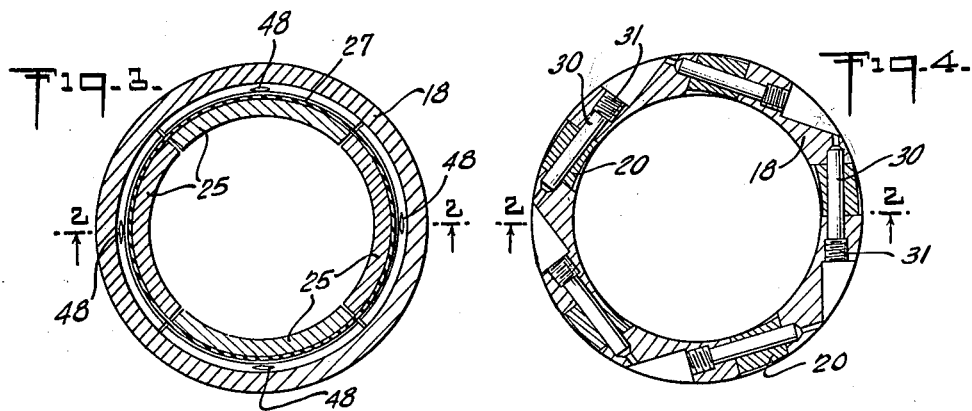

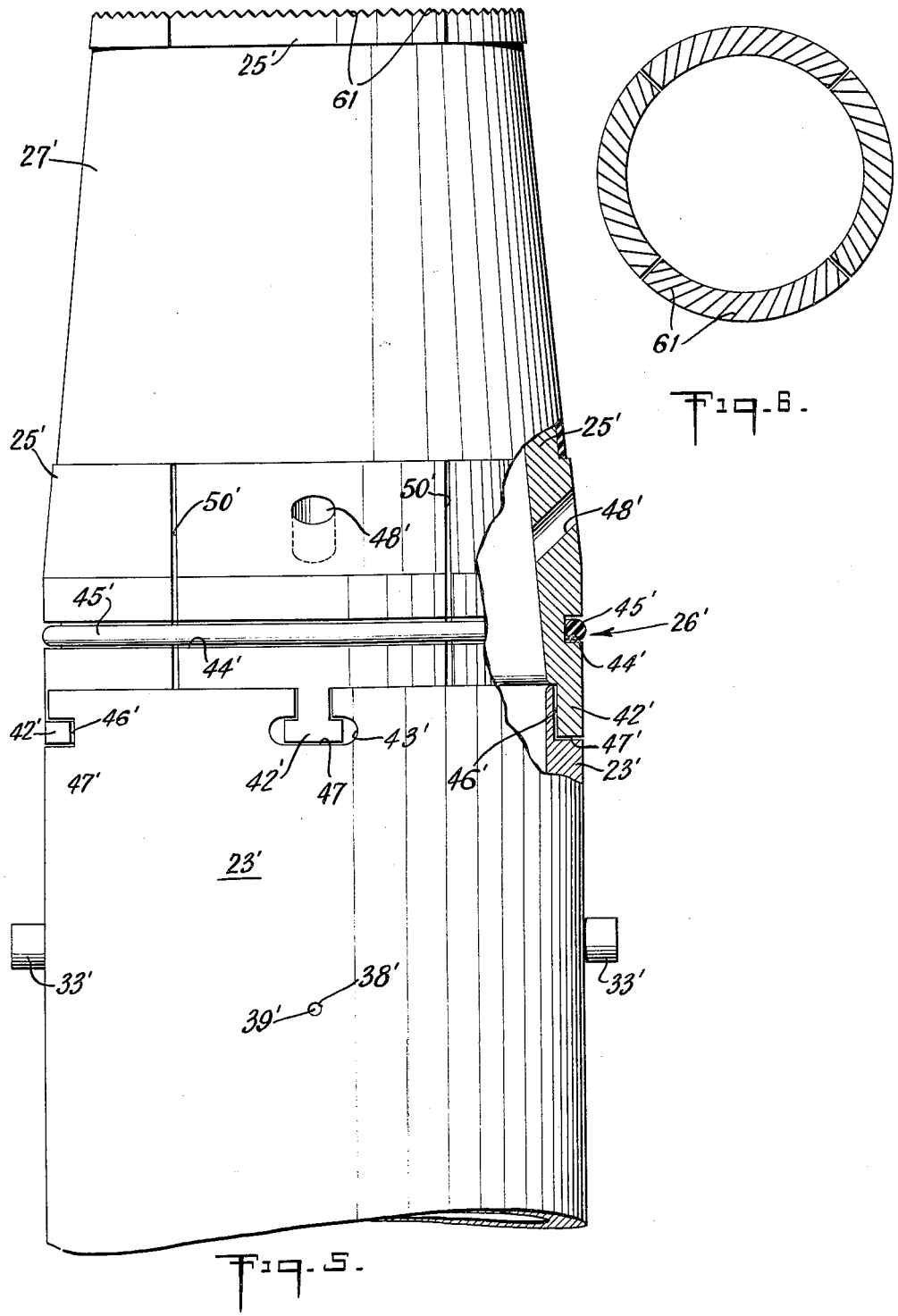

United States Patent Office 3,080,241
Patented Mar. 5, 1963

3,080,241
OUTSIDE PIPE-CUTTING TOOL
Hosea L. Campbell, Houma, La., assignor to Texaco Inc.,
New York, N.Y., a corporation of Delaware
Filed Nov. 16, 1959, Ser. No. 853,024
12 Claims. (Cl. 166—55.6)

This invention is concerned with deep well drilling apparatus, and more specifically with an outside pipe-cutting tool.

The present application is a continuation-in-part of my application Serial No. 688,085, filed October 3, 1957, entitled Outside Pipe-Cutting Tool, now abandoned.

Heretofore there has existed various types of so-called "fishing tools" for use in deep well drilling operations, where drill pipe has becomes stuck for one reason or another and must be removed if the hole is to be drilled any deeper. Also, there may be a long stand of drill pipe left in the hole, and this is of sufficient value to warrant recovery of as much as possible thereof. In general, there are two types of cutting tools for such fishing operations, namely inside cutting tools and outside cutting tools. As the names imply, the inside cutting tools act from the hollow interior of the drill pipe being recovered; while the outside cutting tools act from the outside, i.e. within the surrounding space between the walls of the hole and the exterior of the drill pipe.

This invention is particularly concerned with the latter, or outside, type of cutting tool. The prior types of outside cutting-tools have been found to operate with relatively limited success. Some of such prior tools have a complex mechanical structure, which relies upon springs for the application of a biasing force to cause the cutting knives to act upon the drill pipe being cut. In addition, the mechanism for releasing such spring bias force (in order to activate the cutting knives) must act upon the enlarged joints of the drill pipe in at least one style thereof. For this reason, the major portion of the lowest section of drill pipe which can be reached, must necessarily be lost since the cut takes place near the upper end thereof.

Furthermore, other types of mechanism designed to act upon smooth, or flush jointed drill pipe, is not sufficiently reliable in its action to be very satisfactory.

It has been found that the large forces involved in fishing jobs where the "fish" is to be cut at depths on the order of ten thousand feet and more, renders the operation of cutting tools heretofore known, quite unreliable.

Consequently, it is an object of this invention to provide an outside pipe-cutting tool having superior characteristics that will overcome the above-indicated difficulties.

Another object of this invention is to provide an outside pipe-cutting tool for use in well drilling operations, which may be actuated hydraulically and which is extremely simple in construction and reliable in operation.

Another object of this invention is to provide an outside pipe-cutting tool for use in well drilling operations, which is extremely reliable in operation and successful in difficult situations. In addition, such cutting tool is easy to operate and time saving in completing successful fishing operations.

Briefly this invention concerns a down hole outside pipe-cutting tool that has means for cutting said pipe when rotated relative thereto. The tool also has means for causing said cutting means to move into engagement with said pipe. The improvement comprises structural means located in the annulus between said tool and said pipe for actuating said last named means (the means for causing said cutting means to move into engagement with the pipe). The improvement also comprises resilient means cooperating with said structural means for providing a hydraulic seal to prevent free passage of fluid in said annulus, whereby the cutting means may be actuated by the application of hydraulic pressure in said annulus.

Again briefly, the invention may be described as concerning a downhole fishing tool. It includes in combination, means for cutting a fish from the outside thereof when rotated relative thereto, plus means for actuating said cutting means including segmentized structural means substantially filling the annulus between said fish and said tool, and resilient means for insuring a hydraulic seal and maintaining said segmentized means in contact with said fish.

The above and other objects and advantages of this invention are set forth in greater detail below in connection with the specification which follows, and is illustrated in the drawings, in which:

FIG. 1 is a side elevation partly broken away in cross-section, to illustrate a cutting tool according to the invention, in relationship to a pipe (fish) located in a hole;

FIG. 2 is an enlarged longitudinal cross-section view through the body of the tool, taken along the lines 2—2 of FIGS. 3 and 4;

FIG. 3 is a similarly enlarged transverse cross-section along the lines 3—3 of FIG. 2 and looking in the direction of the arrows;

FIG. 4 is another similarly enlarged transverse cross-section taken along the lines 4—4 of FIG. 2 and looking in the direction of the arrows;

FIG. 5 is a more enlarged, fragmentary side elevation with a portion broken away in section, illustrating the details of the construction of the internal shiftable parts of the body of the tool, including a modification; and FIG. 6 is a plan view, less enlarged than FIG. 5, of the top edge of the frusto-conical segments of the tool body illustrated in FIG. 5, showing the serrations which comprise the modification of this embodiment.

FIG. 1 illustrates one preferred embodiment of this invention, shown as it would be located relative to a drill pipe, or fish 11, that is located in a deep-well hole in a formation 12 in the ground. The cutting tool proper is connected to the surface by means of a larger diameter tube 13 (relative to the pipe or fish 11) that is lowered into the hole, and around the pipe or fish 11 that is to be cut. This operation is usually carried out with some drilling fluid being used to wash the hole in formation 12, as the tool (that is connected to the surface by the tube 13) is being lowered to the desired depth. Such is commonly known as a washover operation.

The body of the tool proper is shown broken away to illustrate the main elements thereof in cross-section. Thus, there is a body portion 18 that is threadably engaged with the tube 13 by a threaded flush joint 19. The body 18 carries pivotally attached thereto, a plurality of knife blades 20 that are situated peripherally around the body 18 at the lower portion thereof, when viewed as illustrated in FIG. 1. Located concentrically inside of the central portion of the body 18 of the tool, there is a slidable cylindrical sleeve 23 that has a beveled surface 24 at the lower edge thereof, which is designed to act in a cam-like manner on the knife blades 20 to force them radially inward about their pivots, into contact with the surface of the pipe 11 that is to be cut.

At the upper edge of the sleeve 23 (when viewed as shown in FIGS. 1 and 2), there are a plurality of frusto-conical segments 25 which rest in supported relation against such edge, as will appear more fully below. Segments 25 have an O-ring seal 26, located near the bases thereof for preventing the flow of hydraulic fluid between the body 18 and the segments 25. Of course, this seal might be located on the cylindrical sleeve 23, but the location illustrated is preferred. In addition, there is a resilient, or flexible material sleeve 27 that overlies the upper portion of the segments 25. Sleeve 27 may be located in a recess on the surfaces of the segments 25 defined by upper and lower shoulders, in order to provide a flush surface on the exterior of the segments and confine the sleeve by the shoulders to hold the sleeve 27 in place.

Operation

The operation of the cutting tool will be described in connection with FIG. 1 and with reference to some of the larger elements thereof, while some of the details plus some of the smaller elements will be described, and referred to hereafter, in connection with the other FIGURES of the drawings.

As already indicated above, the cutting tool will be lowered into place by washing it down the hole around the drill pipe 11, or other pipe or the like (usually termed the "fish") that is to be recovered. When a desired depth has been reached, the cutting operation will be carried out by simply applying sufficient hydraulic pressure to the mud, or other hydraulic fluid located in the space between the outside of pipe 11 and the inside of the body 18 of the tool. When such pressure is applied, there will be a piston-like longitudinal movement of the cam-action sleeve 23, downward (as viewed in FIGS. 1 and 2) within the body 18 of the tool.

This takes place by reason of the restriction to flow of the hydraulic fluid that is caused by segments 25 together with the sleeve 27 (which both holds the segments in contact with the surface of the pipe or fish 11 and closes a substantial part of the longitudinal spaces between segments). At the same time, the O-ring seal 26 prevents passage of the fluid on the outside, i.e. between the inside surface of body 18 and the outside of the bases of the segments 25.

The downward movement of the sleeve (cylinder) 23, causes the beveled edge 24 (cam surface) thereof to contact the curved surfaces near the tips of the knives 20 and forces the knives to pivot inward until the sharp tips or cutting edges thereof bear against the surface of the pipe or fish 11. Then while a desired hydraulic pressure is maintained on the fluid, e.g. from twelve hundred to two thousand pounds per square inch, the body 18 of the tool is rotated, which carries the knife blades 20 around the pipe 11 and thus causes the desired cutting action of the fish. Then, when a cut has been completed, the tool 18 may be raised to the surface while the pipe or fish 11 above the cut will also be raised therewith. This raising of the fish takes place since the knife blades 20 will be pivoted inward and then will act as a support for the fish or pipe 11 as it is raised.

Referring to FIGS. 2, 3 and 4, some of the smaller elements and details which have not been described above, will be pointed out in relationship to the larger elements which have been described.

It will be noted that the knife blades 20 are each pivoted on a stub shaft or pivot pin 30 which is held in place in a drilled hole, tangentially located through the body 18 of the tool, by means of a short lock screw 31. It will be noted that there are illustrated five knife blades 20 in the body 18 of the tool. However, it will be appreciated that there might be more or less than this number employed, without deviating from the teachings of this invention.

An important feature of this construction lies in the fact that the pivot pins 30 may have a maximum diameter in order to provide high strength for supporting the knife blades 20. One reason for the ability to use such maximum diameter pivot pins 30, is the location thereof in the body portion 18 of the tool below the thinner walled portion of body 18. This thinner walled portion contains the actuating cylinder or sleeve 23 and related structure.

It is also to be noted that following the completion of a cut through the fish 11, the knife blades or cutters 20 will take up a full inwardly pivoted position. In such position, they will overlap one another near the free ends thereof, so as to form a mutually supporting bridge-like arrangement which lies under the fish and supports same for the raising thereof to the surface.

The sleeve 23 (cutter-actuating cylinder) is restrained against rotation relative to the body 18 of the tool, by means of a pair of locating screws 32 and 33. Each of these screws 32 and 33 is threaded into firm engagement with the cylindrical sleeve 23, while the head portion of each is cylindrical in outside configuration and is adapted to slide freely along a slot 34 and 35 respectively, in the body 18.

The sleeve 23 also has a small hole 38 conveniently located radially through the sleeve, for receiving a relatively soft material pin, e.g. a brass shear pin 39. This shear pin 39 extends all the way through both the sleeve 23 and the body 18 of the tool. Of course, the shear pin 39 need merely extend sufficiently across the space between the outside of sleeve 23 and the inside of the body 18 of the tool, to provide for the desired shearing action of the pin; but the most expedient construction is that of having the drilled hole 38 extending radially all the way through both the body 18 and the sleeve 23. It is pointed out that the function of the shear pin 39 is to maintain the sleeve 23 in its upper position (as illustrated in the drawings) until it is desired to commence a cut. Then when a cut is to be made, the increased hydraulic fluid pressure that is applied as described above, will cause the pin 39 to shear and then will slide the cam edged cylinder 23 to cam the knife blades 20 into cutting position, by the action of the beveled (cam) edge 24.

It may be observed that knife blades 20 are not restrained in any given position but merely pivot freely about their pivot pins 30. It has been found expedient in practice to hold the blades 20 in their open position (i.e. that illustrated in full lines in FIG. 2) as the tool is being lowered in the hole, by wedging a piece of string beside each of the blades while they are in this position.

The segments 25 are each held in place resting on the upper edge of the cylinder or sleeve 23, when the tool is upright, as viewed in FIGS. 1 and 2. This is accomplished by any convenient arrangement, e.g. by means of a piston rein structure such that each segment 25 has an integral, longitudinally extending T-shaped lug 42, which is fitted into complementary T-slot 43 that is cut into the outer surface at the upper edge of the cylinder or sleeve 23. It is to be noted that the T-slot 43 is cut radially deeper than the radial dimension, or thickness of each T-shaped lug 42. This leaves a space 46 between the inside surface of each T-lug 42 and the bottom (radially inside) surface of each T-slot 43. This is to allow some radial movement, or shifting of each segment 25 at the base thereof where it is supported by the upper edge of the cylindrical sleeve 23. There is also a space, or clearance 47 between the lowermost edge (when viewed as shown in FIG. 5) of each T-lug 42 and the bottom (when similarly viewed) of each T-slot 43.

The arrangement just described above, of the cutter actuating cylinder 23 and the segments 25, has two purposes and effects, among others. One of these is the ability to allow segments 25 to shift radially inward toward one another, so that longitudinal spaces 50 between the edges of each of the segments 25 may be thus more fully closed, where they extend below the rubber sleeve 27. In addition, the radial clearance 46 at the lugs 42 and the complementary T-slots 43, is needed to allow for the pivotal movement of the segments 25 which takes place about the base of each. This pivotal movement may be otherwise described as a rocking motion about the central portion of the base of each segment 25. This is so because the bases of the segments 25 rest on the supporting edge of the cylindrical sleeve 23 and so the curvature of the base of each segment 25 comes into play as the segment rocks or pivots. Of course, the amount of this pivotal, or rocking motion that is required for the segments 25 is never very great since the angular movements to the maximum open (or spread apart at the tops of the segments) position is quite small; e.g. on the order of about five degrees.

Furthermore it will be noted that the so-called piston rein structure of the T-lugs 42 and T-slots 43 is merely for the purpose of holding each segment 25 in place to prevent any substantial longitudinal movement, or separation from the cylindrical sleeve 23.

The above indicated limited pivotal movement of each of the segments 25 that is required, takes place by a rocking motion on the edge of the cylindrical sleeve 23, and this may be aided by providing rounded corners on the inside edge of the sleeve 23 and at the corresponding inside edges of the bases of segments 25. Such rounded corners are plainly illustrated in the broken away portion of the FIG. 5 showing, and the same structure exists in the other embodiment that is illustrated in smaller scale in FIG. 2.

As already pointed out above, there is an O-ring type seal 26, which comprises a groove 44 circumferentially extending around each of the segments 25. Grooves 44 are in line with one another and located near the bases of segments 25 which have the shape of a segment of a cylinder, in order to support an O-ring 45 therein. Use of an O-ring type seal 26, provides the substantial benefits of being able to have the dimensions of the segments 25 and of the supporting cylindrical sleeve 23 (relative to the inside diameter of the tool body 18), such that there is plenty of clearance to allow free longitudinal movement of the segments and sleeve within the body of the tool. In this manner, the full force of the hydraulic pressure in the annulus above the segments 25 will act to actuate the cutters 20 into engagement with the fish, unhampered by any frictional binding of these elements.

Located through each of the segments 25, there is a bleed passage 48 for allowing some hydraulic fluid to be jetted through the segments. This is a very important feature of the tool, and the purpose of thus bleeding some of the hydraulic fluid is to direct forceful streams of fluid over the cutter blades 20, in order to wash away the cuttings while at the same time to cool and lubricate them. It will be appreciated that the total area of bleed passages provided, may be regulated by omitting one or more of the passages 48, as well as by adjusting the size of such passages. It is contemplated that the usual size range for these passages will be from, on the order of one quarter inch diameter, to five-eighths inch diameter The latter size would be advisable where the hydraulic fluid contained fibrous material such as is used to control lost circulation.

It is to be noted that the sleeve 27 may be constructed of any feasible material, such as rubber or the like, which will be impervious to the hydraulic fluid, e.g. drilling mud, which is employed. In addition, it is to be noted that the structure of segments 25 and the rubber sleeve 27, is such that a flexible arrangement is provided for maintaining contact between the top edges of the segments 25 and the surface of the pipe or fish 11 that is to be cut. This is so irrespective of whether the diameter of the pipe changes, e.g. by reason of tapered neck type pipe joints.

FIGS. 5 and 6 illustrate a modification of the invention. However, the only structure changed is that of the top edges of the segments. In FIG. 5, only some of the internal elements of the tool (within body 18) are illustrated; and all of the structure and elements involved, with the exception of the top edges of segments 25, are substantially identical with the corresponding elements shown above and described in connection with the FIGS. 2, 3 and 4 illustration. Consequently the same reference numerals are employed in FIG. 5 but with a prime mark added. Therefore none of the details or elements which are the same in this modification need be described again here.

The modification entails the addition of serrations or grooves 61 that are milled or otherwise cut into the top edge surfaces of each of the segments 25' of the tool. It will be observed that the grooves 61 are cut away from a radial direction, and in fact have a slope relative to the radial of the tool that increases from one end of each segment to the other. The purpose of these serrations 61 is merely to provide a tendency to spread apart the segments 25' at the upper or tip ends thereof, when the tool is rotated clockwise when viewed as shown in FIG. 6. The purpose of being thus able to cause a tendency to spread open the segments 25' is to allow the tool to be raised up from a given position over a drill-stem joint, by rotating the tool in the proper direction as it is being raised. In the absence of such serrations the top edges of the segments of the tool might tend to bite into the joints of the drill stem or fish, as the tool is raised upward, particularly at a joint in the drill stem.

Because the FIG. 5 showing is more enlarged, the more detailed elements and the action in connection therewith may be more readily observed by reference thereto. Thus, it will be observed that the spaces 50' between adjacent ones of the segments 25' are substantially closed at the top edges thereof, i.e. on the upper rim beyond the sleeve 27'; when the free edges of the segments 25' are in their most retracted or closed position. These spaces 50' become wider as the bases of the segments 25' are approached. However, by reason of the clearance that is provided in a radial direction between the inside of the T-lugs 42' and the innermost surface of the T-slots 43' (spaces 46') each of the segments 25' may shift bodily at the base thereof in a radial direction which will therefore tend to close up, or reduce the width of the spaces 50'. In this regard it is to be observed that the hydraulic pressure when applied to the segments 25' and the sleeve 27' lying thereover (in the annulus between the body 18 (FIG. 2) of the tool and the outside surface of the fish 11 (FIG. 1)) will of itself tend to force the segments radially inward and so keep the spaces 50' at a minimum. One reason this structure is possible is the fact that an O-ring seal (groove 44' and ring 45') is employed and therefore a substantial clearance between the inner walls of the body 18 (FIG. 2) of the tool and the outside diameter of the segments 25' is permissible.

It will be observed that each of the segments 25' rests bodily upon the top edge of the cylindrical sleeve 23' and consequently may transmit the heavy pressures received from the hydraulic fluid directly to the cylindrical sleeve 23'. Since a down hole tool of this type may not be observed in operation, it is not fully known what contributes most to the success of this invention. But, it is thought that one of the factors may be the ability of this tool to cause a positive and heavy bite of the cutting blades 20 (FIG. 2) into the fish when the hydraulic pressure is applied and as the tool is rotated to make the cut.

It is pointed out that a cutting tool in accordance with this invention is relatively simple in construction, and rugged for withstanding the rough conditions that exist in deep well drilling operations, where the hydraulic pressure (as well as the weight of the equipment involved) is relatively great.

It will be observed that the segments 25 (or 25') are preferably made of steel as are the other parts of the cutting tool in general. In any case, it is a feature of this invention that these segments are constructed of structural material so that they may bear the loads involved, in the application of relatively high hydraulic pressure, e.g. the hydraulic pressure range indicated above of one thousand two hundred to two thousand pounds per square inch. In this manner the resilient sleeve 27 (or 27') need not have structural strength, as indeed it could not be expected to have.

To recapitulate, it will be seen that there has been provided a downhole outside pipe cutting tool comprising, in combination, a tubular body 18 adapted to be lowered into a well over a pipe 11, pivoted pipe cutting means 20 on the interior of the tubular body which are adapted to be swung inwardly into cutting engagement with the pipe, and a sleeve 23 slidably mounted within the tubular body above the pipe cutting means 20 and adapted to slide downwardly into engagement with the pipe cutting means and force them into cutting engagement with the pipe. Sleeve 23 includes on its top a plurality of upstanding frusto conical metal segments 25 adapted to contact the pipe 11 at the upper ends of the segments.

The segments 25 have longitudinal edges in close juxtaposition to one another, and each segment is much wider than any space between the edges to form at least a partial closure about pipe 11. A second sleeve 27 formed of resilient material is sleeved over and encircles the upstanding segments 25 and urges them resiliently inward to engage pipe 11 at their upper ends. Thus the second sleeve 27 covers over a substantial part of any spaces between the edges of the segments to prevent fluid flow therethrough, and the segments and the sleeve 25 so cooperate with one another and with pipe 11 as to provide an improved hydraulic seal between the first sleeve 23 and the pipe whereby hydraulic pressure applied on the top of the device moves the first sleeve downwardly to urge the pipe cutting means 20 with great force against pipe 11.

Additionally, the tool includes aperture means such as the apertures 48 extending from the outside to the inside of the segments 25 below the second sleeve 27 and above the first sleeve 23, for the passage of hydraulic liquid therethrough into contact with the pipe cutting means 20, with the aperture means 48 having a much smaller area than the internal cross-sectional area of the tubular body 18.

Furthermore, the lower end of each segment 25 on its external surface area has the shape of a segment of a cylinder, and each segment has a circumferential external groove 44 containing a sealing ring 45 between the segment 25 and the internal wall of the tubular body 18 to prevent the passage of hydraulic liquid around the outside of the segments.

Actuation of the cutting means 20 upon downward movement of sleeve 23 is assisted by providing on the lower end surface of the sleeve an inwardly and upwardly extending bevelled cam surface 24 over the entire circumference thereof.

In the modification of the invention shown in FIGS. 5 and 6 the construction is basically the same as described above, but additionally the tops of metal segments 25′ are provided with a plurality of transverse serrations 61 which extend in the same clock direction away from radii which pass through the inner ends thereof. The purpose of these serrations is to cause the segments 25′ to spread apart so that the tool may be raised over pipe joints to a desired cutting location by rotating the tool in said clock direction as it is being raised.

While particular embodiments of the invention have been described in considerable detail, in accordance with the applicable statutes, this is not to be taken as in any way limiting the invention but merely as being descriptive thereof.

What is claimed as the invention is:

1. In a down hole outside cutting tool for pipe having means for cutting said pipe when rotated relative thereto, and having means for causing said cutting means to move into engagement with said pipe, the improvement comprising, in combination, segmentized structural means located in the annulus between said tool and said pipe coacting with said last named means for actuating said last named means, said segmentized means substantially filling said annulus, and resilient means comprising a sleeve encircling said segmentized means and urging said segmentized means inwardly for ensuring a hydraulic seal by maintaining said segmentized means in contact with said pipe, whereby the cutting means may be actuated by the application of hydraulic pressure in said annulus.

2. In a down hole outside cutting tool for pipe having means for cutting said pipe when rotated relative thereto, and having means for causing said cutting means to move into engagement with said pipe, the improvement comprising in combination segmentized structural means located in the annulus between said tool and said pipe coacting with said last named means for actuating said last named means, said segmentized means substantially filling said annulus, resilient means comprising a sleeve encircling said segmentized means and urging said segmentized means inwardly for ensuring a hydraulic seal by maintaining said segmentized means in contact with said pipe, whereby the cutting means may be actuated by the application of hydraulic pressure in said annulus, and bleed passage means through said structural means for passing hydraulic fluid therethrough in order to wash and cool said cutting means.

3. In a down hole outside cutting tool for pipe having means for cutting said pipe when rotated relative thereto, and having second means for causing said cutting means to move into engagement with said pipe, the improvement comprising a plurality of high strength frusto-conical segments located in and substantially filling the annulus between said tool and said pipe, said segments being pivotally mounted on said second means, ring seal means located on the outside of and adjacent to the base of said segments for ensuring high pressure hydraulic seal between said segments and the inside surface of said tool, and resilient means comprising a sleeve encircling said segments adjacent to the top of said segments urging said segments radially inward for maintaining a hydraulic seal between said segments and said pipe.

4. In a down hole outside cutting tool for pipe having means for cutting said pipe when rotated relative thereto, and having second means for causing said cutting means to move into engagement with said pipe, the improvement comprising a plurality of high strength frusto-conical segments located in and substantially filling the annulus between said tool and said pipe, said segments being pivotally mounted on said second means, ring seal means located on the outside of and adjacent to the base of said segments for ensuring a high pressure hydraulic seal between said segments and the inside surface of said tool, resilient means comprising a sleeve encircling said segments adjacent to the top of said segments urging said segments radially inward for maintaining a hydraulic seal between said segments and said pipe, and bleed passage means through said segments for jetting some hydraulic fluid over said cutting means.

5. In a down hole outside cutting tool for pipe having means for cutting said pipe when rotated relative thereto, and having second means for causing said cutting means to move into engagement with said pipe, the improvement comprising a plurality of high strength frusto-conical segments located in and substantially filling the annulus between said tool and said pipe, said segments being pivotally mounted on said second means, for ensuring high pressure hydraulic seal between said segments and the inside surface of said tool, a resilient sleeve overlying said segments and extending upward adjacent to the tops thereof for urging the tops radially inward and for closing a substantial part of the space between said segments, and a downwardly directed bleed passage through each of said segments for jetting hydraulic fluid over said cutting means.

6. In a down hole fishing tool, in combination means for cutting a fish from the outside thereof when rotated relative thereto, means for actuating said cutting means including a plurality of frusto-conical segments having ring seal means located on the outside of and adjacent to the bases thereof, cam surface cylinder means for actuating said cutting means into engagement with said fish, means for supporting said segments against one end of said cylinder and permitting both pivotal and radial movement at the bases of said segments including integral T-shaped lugs extending from the bottom of said segments, complementary T-slots in the outside of said cylinder for receiving said lugs with a loose fit, resilient sleeve means overlying said segments and extending adjacent to the top edges thereof, and bleed passage means through said segments for jetting some hydraulic fluid over said cutting means.

7. In a down hole outside pipe cutting tool comprising, in combination, a tubular body, adapted to be lowered into a well over a pipe, pivoted pipe cutting means on the interior of said tubular body adapted to be swung inwardly into cutting engagement with such a pipe, a first sleeve slidably mounted within said tubular body above said pipe cutting means adapted to slide downwardly into engagement with said pipe cutting means and force said pipe cutting means inwardly into cutting engagement with such a pipe, and a plurality of upstanding frusto conical metal segments carried on the top of said first sleeve and adapted to contact said pipe at the upper ends thereof, said segments having longitudinal edges in close juxtaposition, each segment being much wider than any space between said edges, to form at least a partial closure about such a pipe, the improvement which comprises: a second sleeve formed of resilient material sleeved over said upstanding segments and urging said segments resiliently inward to engage said pipe at the upper ends thereof, said second sleeve covering over a substantial part of any spaces between the edges of said segments to prevent fluid flow therethrough, said segments and said second sleeve cooperating with one another and with such a pipe to provide an improved hydraulic seal between said first sleeve and such pipe whereby hydraulic pressure applied on the top thereof moves said first sleeve downwardly to urge said pipe cutting means with great force against such a pipe.

8. In a tool in accordance with claim 7, the further improvement wherein said closure has aperture means extending from the outside to the inside of said closure below said second sleeve and above said first sleeve, for the passage of hydraulic liquid therethrough into contact with said pipe cutting means, said aperture means having much smaller area than the internal cross sectional area of said tubular body.

9. In a tool in accordance with claim 7, the further improvement of a lower end external surface area of each segment having the shape of a segment of a cylinder, each segment having a circumferential external groove therein, and a sealing ring in said groove between said closure and the internal wall of said tubular body near the lower ends of said segments to prevent the passage of hydraulic liquid.

10. In a tool in accordance with claim 7, the lower end surface of said first sleeve having an inwardly and upwardly extending bevel over the entire circumference there to provide an annular bevelled cam surface for actuating said pipe cutting means.

11. In a tool in accordance with claim 7, the tops of said metal segments having a plurality of transverse serrations, said serrations extending in the same clock direction away from radii passing through the inner ends thereof.

12. In a tool in accordance with claim 7, said segments having external aligned circumferentially extending recesses therein defined by upper and lower shoulders, and said second sleeve being located within said recesses and confined therein by said shoulders to hold said second sleeve in place.

References Cited in the file of this patent
UNITED STATES PATENTS

| | | |
|---|---|---|
| 1,625,391 | Reilly et al. | Apr. 19, 1927 |
| 2,284,211 | Justice | May 26, 1942 |
| 2,542,445 | Young | Feb. 20, 1951 |